United States Patent
Iwata et al.

(10) Patent No.: US 7,264,234 B2
(45) Date of Patent: Sep. 4, 2007

(54) GAS HUMIDIFIER

(75) Inventors: Katsuo Iwata, Amagasaki (JP); Yasuhiro Fujita, Amagasaki (JP)

(73) Assignee: Sumitomo Precision Co., Ltd., Amagasaki-shi (JP)

( * ) Notice: Subject to any disclaimer, the term of this patent is extended or adjusted under 35 U.S.C. 154(b) by 116 days.

(21) Appl. No.: 10/519,409

(22) PCT Filed: Jul. 14, 2003

(86) PCT No.: PCT/JP03/08948

§ 371 (c)(1), (2), (4) Date: Sep. 21, 2005

(87) PCT Pub. No.: WO2004/016992

PCT Pub. Date: Feb. 26, 2004

(65) Prior Publication Data

US 2006/0097412 A1    May 11, 2006

(30) Foreign Application Priority Data

Jul. 18, 2002   (JP) .............................. 2002-209941

(51) Int. Cl.
*B01F 3/04* (2006.01)
(52) U.S. Cl. ................. 261/155; 261/156; 261/116
(58) Field of Classification Search ............. 261/152, 261/155, 156, 16, 17, 78.2, 116
See application file for complete search history.

(56) References Cited

U.S. PATENT DOCUMENTS

| | | | |
|---|---|---|---|
| 3,690,839 A * | 9/1972 | Jones | 422/207 |
| 5,178,210 A * | 1/1993 | Guillet et al. | 165/111 |
| 6,019,819 A * | 2/2000 | Williams | 95/206 |
| 6,383,671 B1 * | 5/2002 | Andrews et al. | 429/24 |
| 6,899,741 B2 * | 5/2005 | Nakamura et al. | 48/61 |
| 2003/0096147 A1 * | 5/2003 | Badding et al. | 429/30 |

* cited by examiner

FOREIGN PATENT DOCUMENTS

JP    2002-33111    1/2002

*Primary Examiner*—Scott Bushey
(74) *Attorney, Agent, or Firm*—Oblon, Spivak, McClelland, Maier & Neustadt, P.C.

(57) ABSTRACT

In a gas humidifier used for humidifying fuel in a molten carbonate fuel cell (MCFC), a small-size gas humidifier is achieved by carrying out a steam-generating process and a gas humidifying process by the use of the steam by using a single unit. In order to achieve this structure, a plurality of longitudinal tube plates are laminated in a thickness direction with predetermined intervals so that a heat-exchanger core (100) of a plate-fin type is prepared. Heating-use high-temperature fluid (A) is allowed to flow alternately through a plurality of spaces that are formed inside the heat-exchanger core (100) and placed side by side in the horizontal direction so as to direct a gas to be humidified (B) to another space from above to below. An injection tube (210), which is used for spraying liquid (C) that serves as a steam source, is inserted virtually horizontally along tube plates on two sides in an upper portion of each space through which the gas to be humidified (B) flows. A header pipe (220), which is used for supplying the liquid (C) to the injection tube (210), is connected to the injection tube (210) at a place apart from the heat-exchanger core (100). One portion of the gas to be humidified (B) that has been introduced into the heat-exchanger core (100) is allowed to flow outside the heat-exchanger core (100) and to contact the header pipe (220) placed outside thereof.

3 Claims, 5 Drawing Sheets

# GAS HUMIDIFIER

Figure 1:
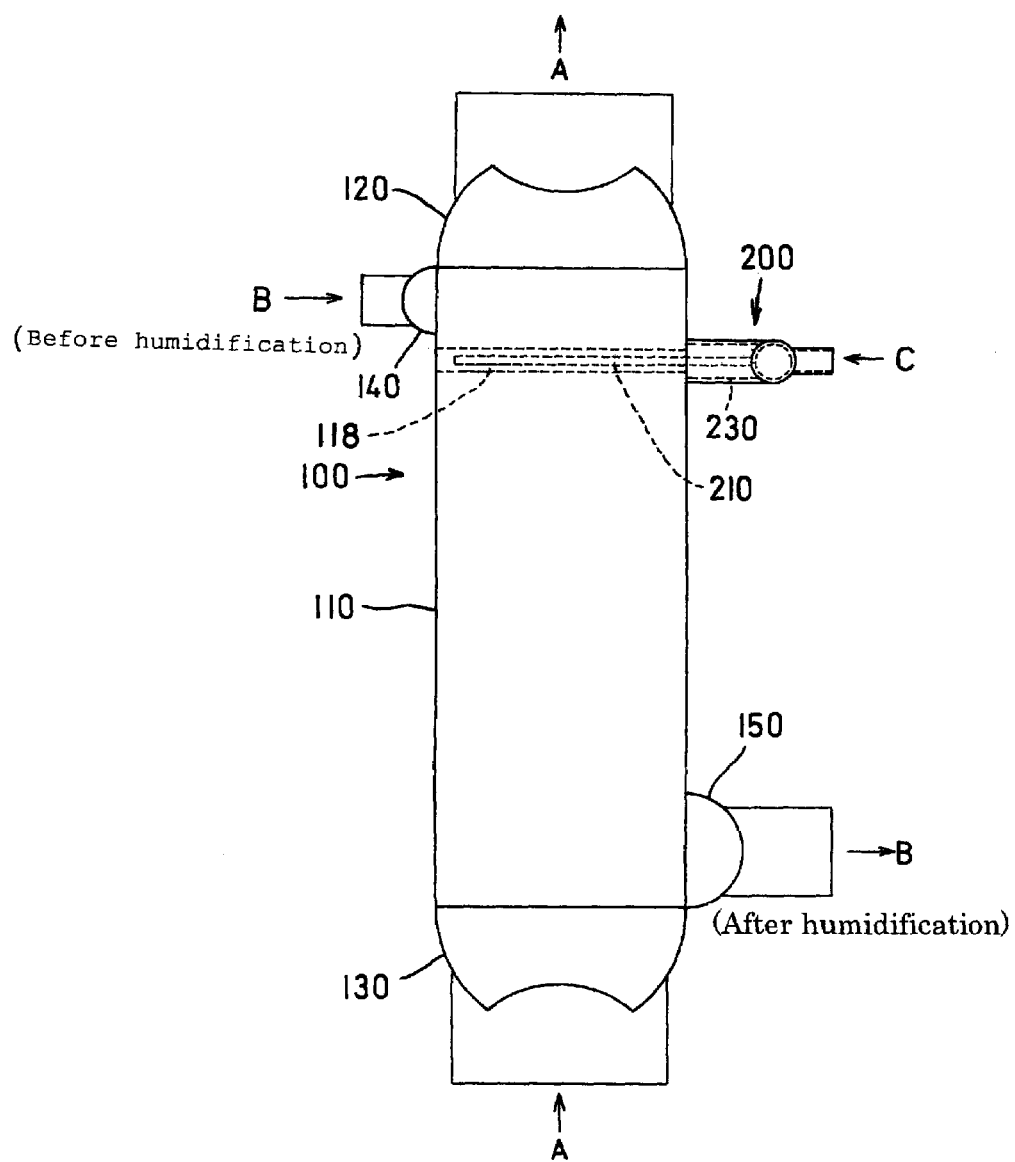

This application is a national stage application of PCT/JP03/08948 filed on Jul. 14, 2003 under 35 U.S.C. 371. This application claims foreign priority under 35 U.S.C. 119 to Japanese application 2002-209941, filed Jul. 18, 2002.

FIELD OF THE INVENTION

The present invention relates to a gas humidifier that is used for humidifying fuel in a molten carbonate fuel cell (MCFC).

BACKGROUND OF THE INVENTION

In a molten carbonate fuel cell, after a fuel gas such as natural gas has been humidified by steam, the resulting gas is allowed to react with a modifying catalyst, and then supplied to a fuel cell. In this case, conventionally, the humidifying process is carried out by mixing the fuel gas at normal temperature and steam generated by a boiler in a unit separated from the boiler.

In the conventional humidifying process of this type, two units, that is, the boiler and a mixing device, are required, inevitably resulting in a large-size facility. In order to solve this problem, there have been strong demands for a gas humidifier that is developed so as to carry out a steam-generating process and a process for mixing the generated steam and the fuel gas by using a single unit.

The objective of the present invention is to provide a small-size gas humidifier which can effectively execute the steam-generating process and the humidifying process by the generated steam and the fuel gas by using a single unit.

DISCLOSURE OF THE INVENTION

In order to achieve the above-mentioned objective, a gas humidifier of the present invention is provided with a heat-exchanger core of a plate-fin type in which a plurality of longitudinal tube plates are laminated in a thickness direction with predetermined intervals so that a plurality of spaces, aligned side by side in the horizontal direction, are formed, with heating-use high-temperature fluid being allowed to flow alternately through those spaces, so as to direct a gas to be humidified to another space from above to below, an injection tube that is inserted virtually horizontally along tube plates on two sides in an upper portion of each space so as to spray a liquid that serves as a steam source into the space in which the gas flows from above to below, and a header pipe that is connected to the injection tube at a place apart from the heat-exchanger core so as to supply the liquid to the injection tube.

In the gas humidifier of the present invention, the heating-use high-temperature fluid is allowed to flow through one of spaces of the two kinds that are formed in the heat-exchanger core, while a gas to be humidified is allowed to flow from above to below through the other space, and the liquid serving as a steam source is supplied to the upper portion thereof through the injection tube. With this arrangement, the liquid evaporates to form steam and the steam is mixed with the gas to be humidified so that the gas is humidified. Here, since the header pipe, which supplies the liquid serving as a steam source to the injection tube, is apart from the heat-exchanger core so that it becomes possible to effectively prevent vapor locking or the like, and consequently to stably supply the liquid.

More preferably, one portion of the gas to be humidified that has been introduced to the upper portion of the space is allowed to flow outside the heat-exchanger core and to contact the header pipe placed outside thereof. With this arrangement, the header pipe is cooled off by utilizing the gas so that it becomes possible to supply the liquid more stably.

The clearance between the heat-exchanger core and the header pipe is preferably set in a range from 100 to 300 mm. When the clearance is too short, it is not possible to sufficiently prevent vapor lock or the like. In contrast, when the clearance is too long, it is not possible to provide appropriate compactness.

BRIEF DESCRIPTIONS OF THE DRAWINGS

Figure 2:
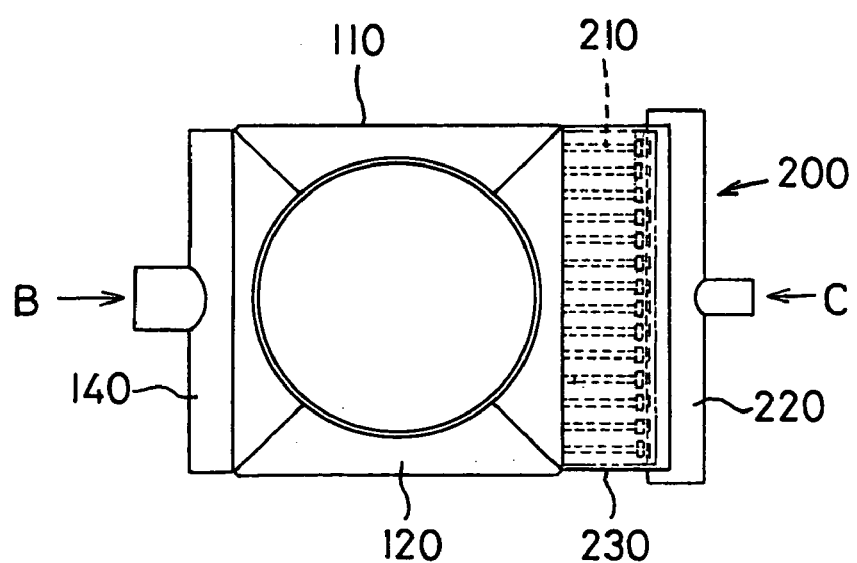
Figure 3:
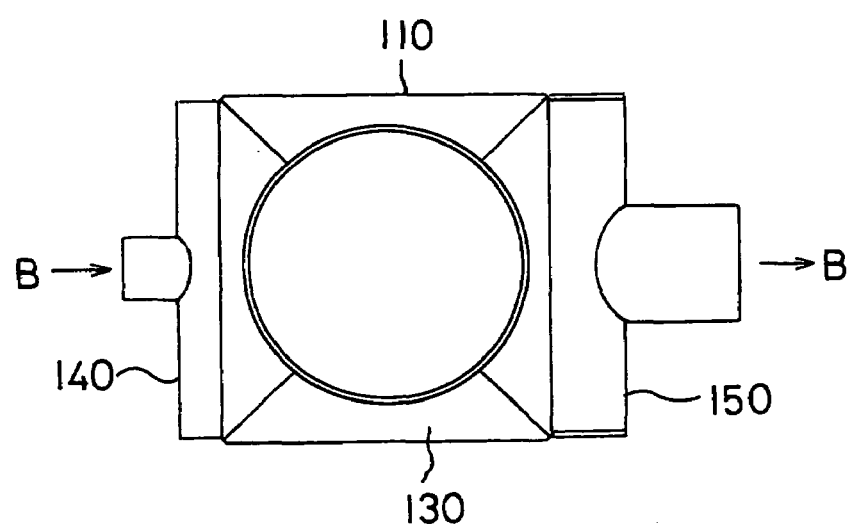
Figure 4:
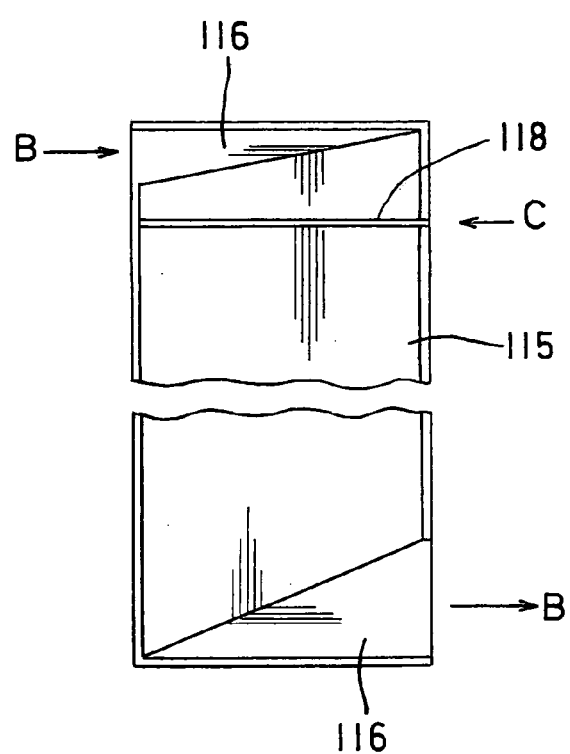
Figure 5:
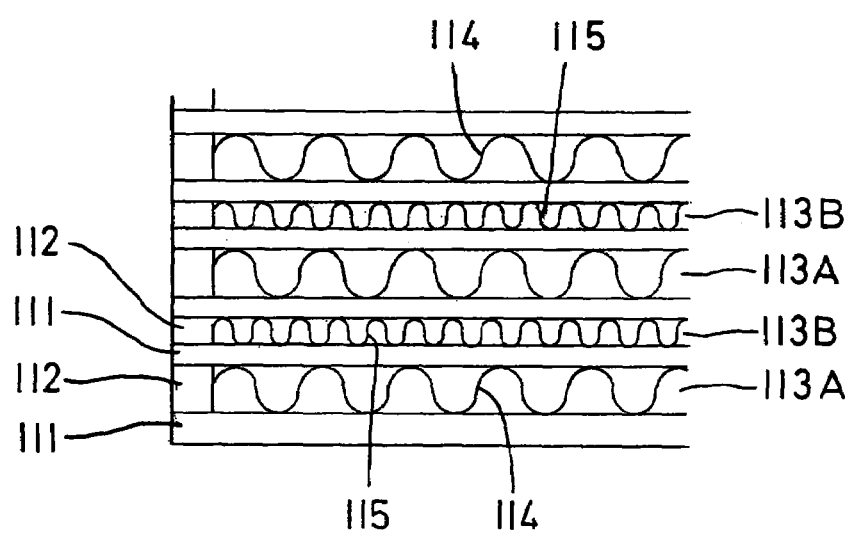

FIG. 1 is a side view that shows a gas humidifier in accordance with one embodiment of the present invention.
FIG. 2 is a plan view of the gas humidifier.
FIG. 3 is a bottom view of the gas humidifier.
FIG. 4 is a longitudinal cross-sectional side view that shows a heat-exchanger core in the gas humidifier of FIG. 4.
FIG. 5 is a lateral cross-sectional plan view of the heat-exchanger core.

BEST MODE FOR CARRYING OUT THE INVENTION

Referring to Figures, the following description will discuss embodiments of the present invention.

A gas humidifier of the present embodiment is used for a fuel humidifying process in a molten carbonate fuel cell (MCFC). This gas humidifier is constituted by a heat-exchanger core 100 having a plate-fin-type heat exchanger as its basic structure and a water-supply mechanism 200 that supplies water C into the heat-exchanger core 100 as a steam source.

The heat-exchanger core 100 is basically constituted by a rectangular parallelepiped core main body 110 composed of a longitudinal plate-fin-type heat exchanger, a derivation header 120 for heating-use gas A that is attached to the upper face of the core main body 110, an introductory header 130 for heating-use gas A that is attached to the lower face of the core main body 110, an introductory header 140 for fuel gas B that is attached to the upper front face of the core main body 110 and a derivation header 150 for fuel gas B that is attached to the lower rear face of the core main body 110. The derivation header 120 and the introductory header 130 have a dome shape, and the introductory header 140 and the derivation header 140 have a vault shape, and each of these is directly attached to the core main body 110.

The core main body 110 is provided with a number of perpendicular tube plates 111 that are placed side by side in the horizontal direction with predetermined intervals and a pair of front and rear spacer bars 112 that are placed between these so as to form a fluid flowing space in the longitudinal direction between the adjacent tube plates 111.

The fluid flowing space has a structure in which a perpendicular first space 113A, which allows high-temperature heating-use gas A used for evaporating water C to flow from below upward, and a perpendicular second space 113B, which allows fuel gas B to be humidified to flow from above downward together with humidifying steam, are alternately laminated in the aligned direction of the tube plates 111.

In the first space 113A, perpendicular corrugated fins 114, formed as repetitive recessed portions and protruding portions in the horizontal direction, are placed over the full height. Thus, the first space 113A allows the derivation header 120 and the introductory header 130 to communicate with each other. In the second space 113B, perpendicular corrugated fins 115 are placed except for upper and lower portions and for another one portion. In the upper and lower portions of the second space 113B, horizontal corrugated fins 116 are placed so as to allow the introductory header 140 and the derivation header 150 to communicate with each other. A vacant space 118, which is formed by removing the fins, is prepared on the upper portion of the corrugated fins 115 so that an injection tube, which will be described later, is inserted to this vacant space 118.

A water-supply mechanism 200, which supplies water C used for generating steam into the heat-exchanger core 100, is provided with a plurality of injection tubes 210 that are horizontally inserted to the respective vacant spaces 118 inside the second spaces 113B from the rear face side of the core main body 110 and horizontal header pipes 220 that are connected to the injection tubes 210 at the right angle. The respective injection tubes 210 are inserted to the vacant spaces 118 virtually over the full length thereof, and a plurality of nozzle holes are formed on the lower face of the insertion portion with predetermined intervals.

The rear portion of each injection tube 210 protrudes toward the rear face side of the core main body 110 through a through hole formed in each spacer bar 112, and the protruding portion is connected to a header pipe 220 having a cylinder shape, which is placed apart from the core main body 110 on the rear face side of the core main body 110. Here, each of the protruding portions is housed in a laterally elongated case 230 placed between the rear face of the core main body 110 and the header pipe 220. Here, the inner diameter of the through hole to which each of the injection tubes 210 is inserted is made sufficiently greater than the outer diameter of each of the injection tubes 210. Thus, the case 230 is allowed to communicate with each vacant space 118 through a ring-shaped gap formed on the periphery of each injection tube 210.

The following description will discuss functions for the gas humidifier in accordance with the present embodiment.

In the core main body 110 of the heat-exchanger core 100, high-temperature heating-use gas A is introduced into the perpendicular first spaces 113A from below, and allowed to flow from below upward. Moreover, normal-temperature fuel gas B to be humidified is introduced into the perpendicular second spaces 113B from above, and allowed to flow from above downward. Here, water C is sprayed from the injection tubes 210 in the respective upper portions of the second spaces 113B.

In this case, the perpendicular second spaces 113B have been heated to a high temperature together with the corrugated fins 115 and 116 placed inside thereof. For this reason, the water C that has been sprayed inside the upper portions of the second spaces 113B from the injection tubes 210 is evaporated immediately to form high-temperature steam. Thus, the fuel gas B, which is allowed to flow through the second spaces 113B from above downward, is mixed with the high-temperature steam. Consequently, a humidified fuel gas B is formed, and discharged from the introductory headers 150.

Moreover, the header pipes 220, which supply water C to the injection tubes 210, is separated from the rear face of the core main body 110. Since the core main body 110 has been heated to a high temperature, vapor locking or the like tends to occur, when the header pipes 220 are directly made in contact with the core main body 110 as in the case of the other headers. The amount of addition of water C to the fuel gas B is properly adjusted in accordance with the flow rate of the fuel gas B. The flow rate of the fuel gas B is changed within a very wide range, for example, from 10 to 100%. The problem of vapor locking tends to occur particularly when the flow rate of the fuel gas B is reduced, with the amount of addition of water C being extremely reduced correspondingly.

However, in the gas humidifier of the present embodiment, since the header pipes 220 are separated from the rear face of the core main body 110, it is possible to effectively prevent vapor locking even when the amount of addition of water C is reduced; thus, it becomes possible to stably add water C, and also to achieve a stable mixing process of steam and a stable humidifying process.

Moreover, in the present embodiment, the inner diameter of the through hole to which each injection tube 210 is inserted is set to a size that is sufficiently greater than the outer diameter of each injection tube 210 and a ring-shaped gap is formed between the two members. For this reason, the comparatively low-temperature fuel gas B, introduced into the upper portions of the second spaces 113B, is allowed to flow into the case 230 through the gaps so that portions ranging from the rear portions of the injection tubes 210 to the header pipes 220 are forcefully cooled off. Therefore, the vapor locking is prevented more effectively.

INDUSTRIAL APPLICABILITY

As described above, in the gas humidifier of the present invention, a liquid serving as a steam source is supplied to spaces of core of a plate-fin type heat-exchanger through which a gas to be humidified is allowed to flow from above downward, from the upper portions thereof through injection tubes, and header pipes, which supply the liquid to the injection tubes, are separated from the core; thus, it becomes possible not only to carry out a steam generating process and a humidifying process by the use of the steam by using a single unit, but also to achieve a stable humidifying process, even when the flow rate of the gas to be humidified is reduced with a reduced amount of supply of the liquid serving as the steam source; thus, the flow rate can be changed within a wider range.

The invention claimed is:

1. A gas humidifier comprising:
   a heat-exchanger core of a plate-fin type in which a plurality of longitudinal tube plates are laminated in a thickness direction with predetermined intervals so that a plurality of spaces, aligned side by side in the horizontal direction, are formed, with heating-use high-temperature fluid being allowed to flow alternately through those spaces, so as to direct a gas to be humidified to another space from above to below;
   an injection tube that is inserted virtually horizontally along tube plates on two sides in an upper portion of each space so as to spray a liquid that serves as a steam source into the space in which the gas flows from above to below; and
   a header pipe that is connected to the injection tube at a place apart from the heat-exchanger core so as to supply the liquid to the injection tube.

2. The gas humidifier according to claim 1, wherein one portion of the gas to be humidified that has been introduced to the upper portion of the space is allowed to flow outside the heat-exchanger core and to contact the header pipe placed outside thereof.

3. The gas humidifier according to claim 1, which is used for humidifying fuel in a molten carbonate fuel cell (MCFC).

* * * * *